(12) United States Patent
Wagner, Jr.

(10) Patent No.: US 11,420,278 B2
(45) Date of Patent: Aug. 23, 2022

(54) SYSTEM AND METHOD EMPLOYING ACTIVE THERMAL BUFFER ELEMENT FOR IMPROVED JOULE HEATING

(71) Applicant: Spirit AeroSystems, Inc., Wichita, KS (US)

(72) Inventor: James Michael Wagner, Jr., Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 556 days.

(21) Appl. No.: 16/022,139

(22) Filed: Jun. 28, 2018

(65) Prior Publication Data

US 2020/0001385 A1   Jan. 2, 2020

(51) Int. Cl.
   *B23H 11/00* (2006.01)

(52) U.S. Cl.
   CPC ........ *B23H 11/006* (2013.01); *B23H 2500/00* (2013.01)

(58) Field of Classification Search
   CPC .... B23H 11/006; B23H 2500/00; B23H 7/10; H05B 3/0004; H05B 2203/016
   See application file for complete search history.

(56) References Cited

U.S. PATENT DOCUMENTS

| | | | |
|---|---|---|---|
| 8,308,876 B2 | 11/2012 | Woods et al. | |
| 2003/0178177 A1* | 9/2003 | Eytcheson | H01L 21/4882 165/80.2 |
| 2006/0048809 A1* | 3/2006 | Onvural | H01L 35/04 136/212 |
| 2010/0028800 A1 | 11/2010 | Ishiguro et al. | |
| 2017/0318660 A1* | 11/2017 | Roan | G01R 19/0092 |
| 2018/0007180 A1 | 1/2018 | Song et al. | |

FOREIGN PATENT DOCUMENTS

| | | | |
|---|---|---|---|
| CN | 101318203 A | * | 12/2008 |
| KR | 10-2018-0026314 | | 3/2018 |
| KR | 20180026314 A | * | 3/2018 |
| KR | 10-2018-0039921 | | 4/2018 |
| KR | 20180039921 A | * | 4/2018 |

OTHER PUBLICATIONS

International Search Report for PCT Appln No. PCT/US2019/038707; dated Oct. 16, 2019 and all references cited therein.

* cited by examiner

*Primary Examiner* — Justin C Dodson
*Assistant Examiner* — Dilnessa B Belay
(74) *Attorney, Agent, or Firm* — Hovey Williams LLP

(57) ABSTRACT

A system and method for more consistent joule heating of a material blank to a desired temperature. An electrical terminal delivers a current to an end portion of the blank. The terminal has a heat sink effect which would otherwise prevent the end portion from reaching the desired temperature. An active thermal buffer element is interposed between the terminal and the end portion. The buffer element includes a first surface which abuts the end portion and a second surface which abuts the terminal. The buffer element is joule heated with the blank, and a temperature gradient is created across the buffer element such that the first surface is at the desired temperature and the second surface is at a lower temperature due to the heat sink effect of the terminal. The buffer element thereby compensates for the heat sink effect and allows the end portion to reach the desired temperature.

20 Claims, 7 Drawing Sheets

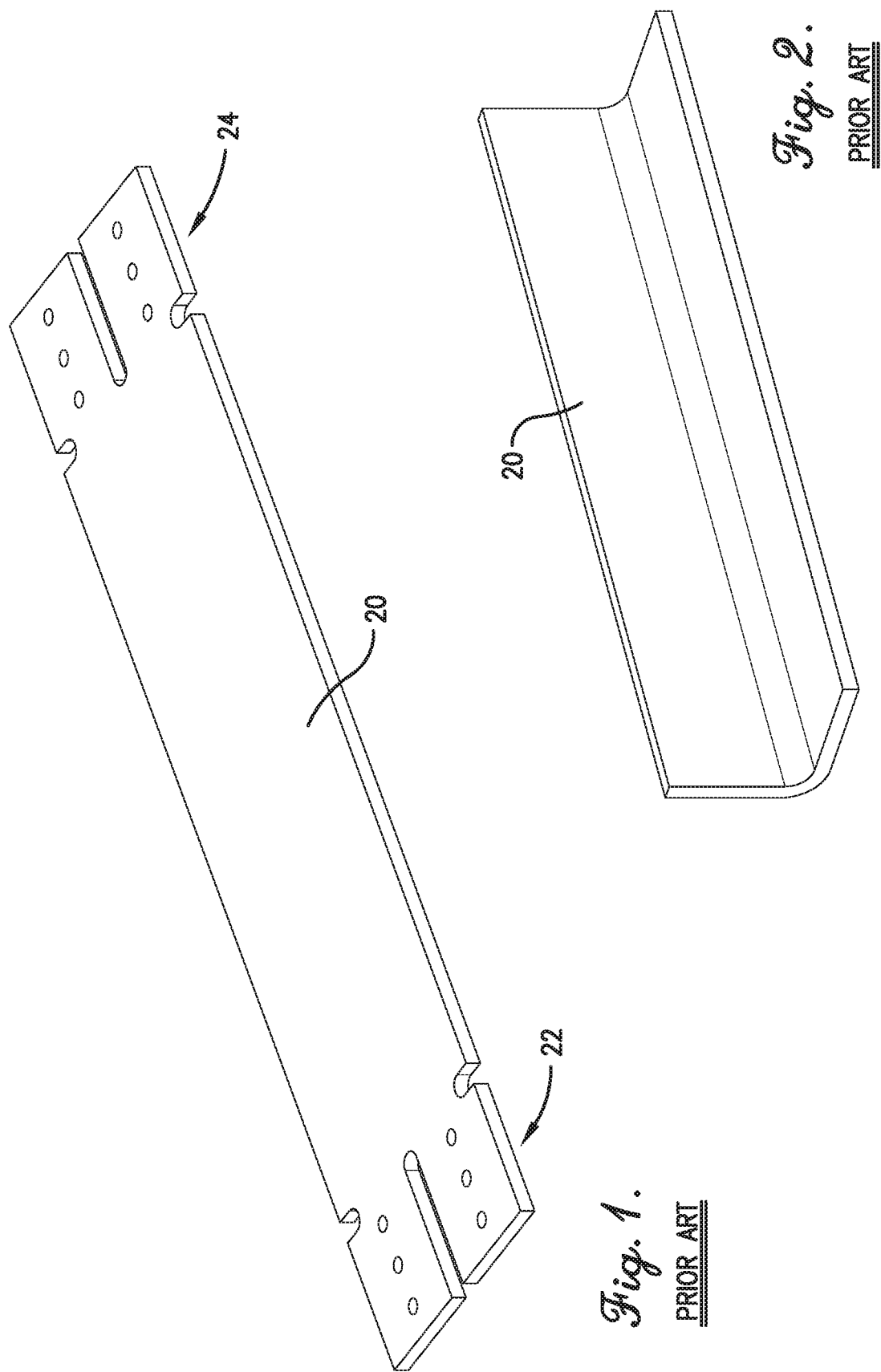

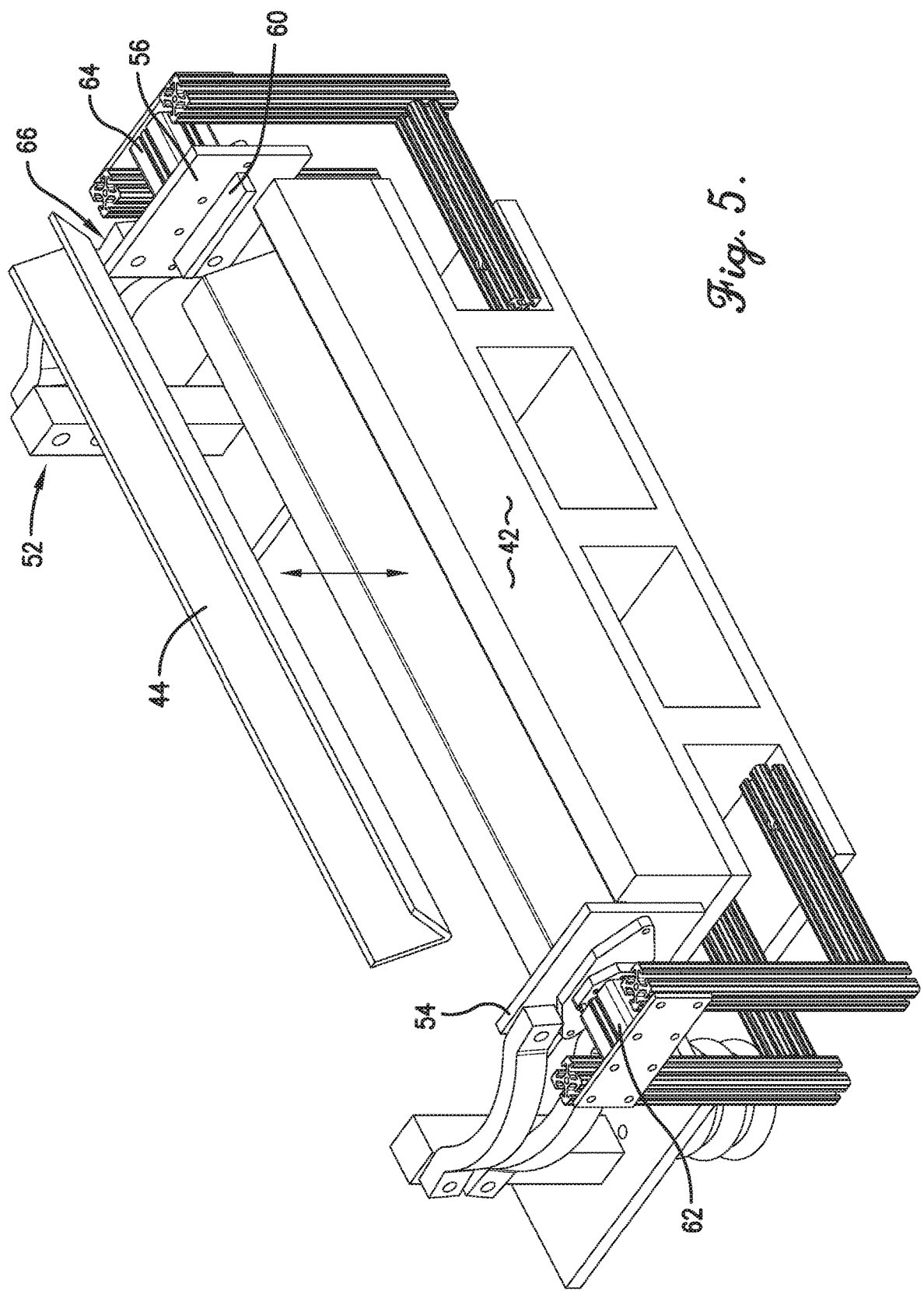

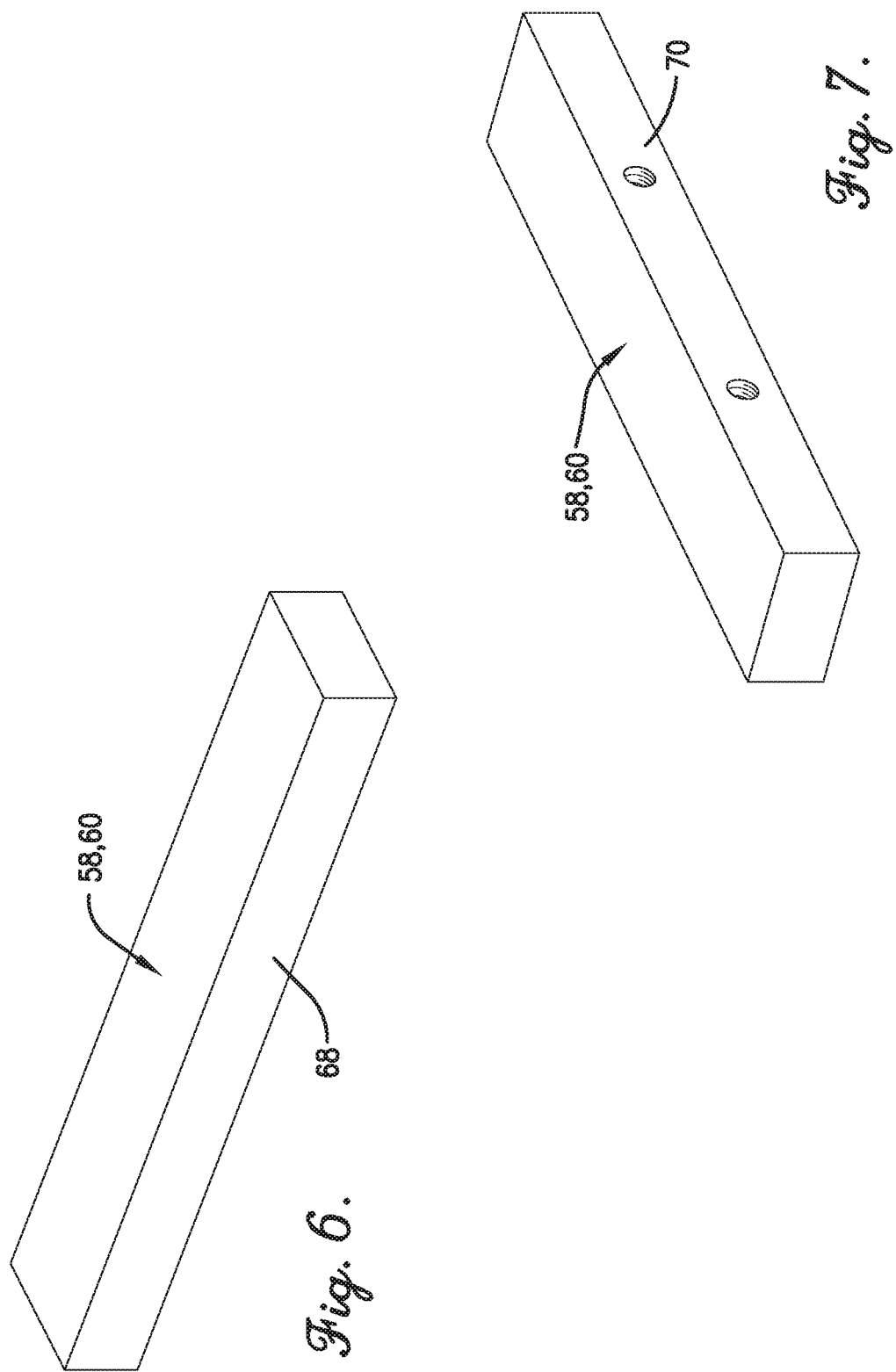

SYSTEM AND METHOD EMPLOYING ACTIVE THERMAL BUFFER ELEMENT FOR IMPROVED JOULE HEATING

FIELD

The present invention relates to systems and methods for heating materials using joule heating, and more particularly, embodiments concern a system and method employing an active thermal buffer element to reduce the thermal effects of an electrical terminal on an end portion of a material, and thereby provide more consistent joule heating of the material.

BACKGROUND

Joule heating, also referred to as resistive heating, is the generation of heat by passing an electric current through an electrically conductive material. Joule heating is used, for example, in forming metal components of aircraft and other vehicles and structures. Referring to FIG. 1 (PRIOR ART), an example metal blank 20 to be joule heated and formed is created with end portions 22,24 configured (with, e.g., bolt holes) to physically connect to the electrical connections (e.g., copper terminals) of an electrical bus. Referring also to FIG. 2 (PRIOR ART), once the metal blank 20 has been joule heated and formed, the end portions 22,24 are removed, and the formed metal blank 20 may be further machined to its final shape. However, the material of the electrical connections introduces thermal effects which interfere with the consistent heating of the end portions 22,24 of the metal blank 20 which are in physical contact with the electrical connections. For example, the electrical connections can act as heat sinks which draw heat away from the end portions 22,24 so that they remain at a lower temperature than the rest of the metal blank 20.

Further, in order to have sufficient contact area to heat the blanks used for forming, the mechanisms must be moved away from the forming plate to allow unimpeded movement of the under-heated material. Remaining in contact using flexible couplings or other solutions results in undesirable deformation and greater concern for the dimensional stability of the plate being formed. In one solution, the blanks are bolted to the copper electrical bus via a plate that contacts the blank and remains moveable to accommodate the movement of the electrical tabs machined into the blanks via flexible copper couplings. These copper couplings are essentially large copper springs which enable the bolted copper plates used as an electrical bus to move with the relatively cool parts of the formed blanks. Titanium blanks formed using a bolted-on copper bus with flexible couplings deform noticeably due to the force of the springs pulling on the heated blanks. The formed plates have the greatest dimensional variation nearest the electrical tabs which are pulled on by the flexible copper couplings. This background discussion is intended to provide information related to the present invention which is not necessarily prior art.

SUMMARY

Embodiments address the above-described and other problems and limitations in the prior art by providing a system and method employing an active thermal buffer element to reduce the thermal effects of an electrical terminal on an end portion of a material, and thereby provide more consistent joule heating of the material.

In a first embodiment, a system is provided for achieving more consistent joule heating of a material blank to a desired temperature, the material blank having an end portion. The system may broadly include an electrical terminal and an active thermal buffer element. The electrical terminal may be configured to deliver an electrical current to the end portion of the material blank in order to joule heat the material blank, wherein the electrical terminal has a thermal heat sink effect. The active thermal buffer element may be electrically and thermally interposed between the electrical terminal and the end portion of the material blank, and may be configured to be joule heated by the electrical current and to compensate for the thermal heat sink effect of the electrical terminal and thereby allow the end portion of the material blank to reach the desired temperature.

In a second embodiment, a method is provided for achieving more consistent joule heating of a material blank to a desired temperature, the material blank having an end portion. The method may include the following steps. An active thermal buffer element may be electrically and thermally interposed between the electrical terminal and the end portion of the material blank, the active thermal buffer element may include a first contact surface configured to physically abut the end portion of the material blank, and a second contact surface configured to abut the electrical terminal. An electrical current may be delivered via an electrical terminal to joule heat the active thermal buffer element and the material blank, wherein the electrical terminal has a thermal heat sink effect. The active thermal buffer element may be joule heated to create a temperature gradient across the active thermal buffer element such that the first contact surface is at least at the desired temperature and the second contact surface is at a lower temperature due to the thermal heat sink effect of the electrical terminal, and thereby compensating for the thermal heat sink effect of the electrical terminal and allowing the end portion of the material blank to reach the desired temperature.

Various implementations of the foregoing embodiments may include any one or more the following additional or alternative features. The active thermal buffer element may include a first contact surface configured to physically abut the end portion of the material blank, and a second contact surface configured to abut the electrical terminal, wherein joule heating of the active thermal buffer element creates a temperature gradient across the active thermal buffer element such that the first contact surface is at least at the desired temperature and the second contact surface is at a lower temperature due to the thermal heat sink effect of the electrical terminal. The material blank may be constructed of titanium and the active thermal buffer element may be constructed of stainless steel, or the material blank may be constructed of titanium and the active thermal buffer element may be constructed of tungsten. The active thermal buffer element may be constructed of two or more materials having different electrical or thermal characteristics. The first contact surface may have a non-planar shape selected from the group consisting of: rounded, angled, and knurled.

An additional forming subsystem/submethod may be configured to physically support and form the material blank into a desired shape once the material blank has been joule heated to the desired temperature. The forming subsystem/submethod may include a support element configured to physically support the material blank in a desired position both for joule heating and for forming, and a forming tool configured to apply a physical force to the material blank during forming to change an initial shape of the material blank to the desired shape.

Additional elements of a joule heating subsystem/submethod may be configured to send the electrical current through and thereby joule heat the material blank to a desired temperature in preparation for forming the material blank. The joule heating subsystem/submethod may include an electrical bus configured to carry the electrical current from a current source to the electrical terminal for accomplishing the joule heating, an actuation element configured to move the electrical terminal and the active thermal buffer element into and out of electrical contact with the material blank, and a flexible member connecting the electrical terminal to the electrical bus, and configured to accommodate movement of the electrical terminal relative to the electrical bus during actuation of the actuation element.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 1 (PRIOR ART) is perspective view of a metal blank to be joule heated and formed and including an end portion configured to physically connect to an electrical terminal;

FIG. 2 (PRIOR ART) is a perspective view of the metal blank of FIG. 1 (PRIOR ART) after joule heating and forming, and with the end portions removed;

FIG. 5 is an isometric view of the system of FIG. 3 with the material blank removed;

FIG. 6 is a first isometric view of an embodiment of the active thermal buffer element;

FIG. 7 is a second isometric view embodiment of the active thermal buffer element;

Figure 3:
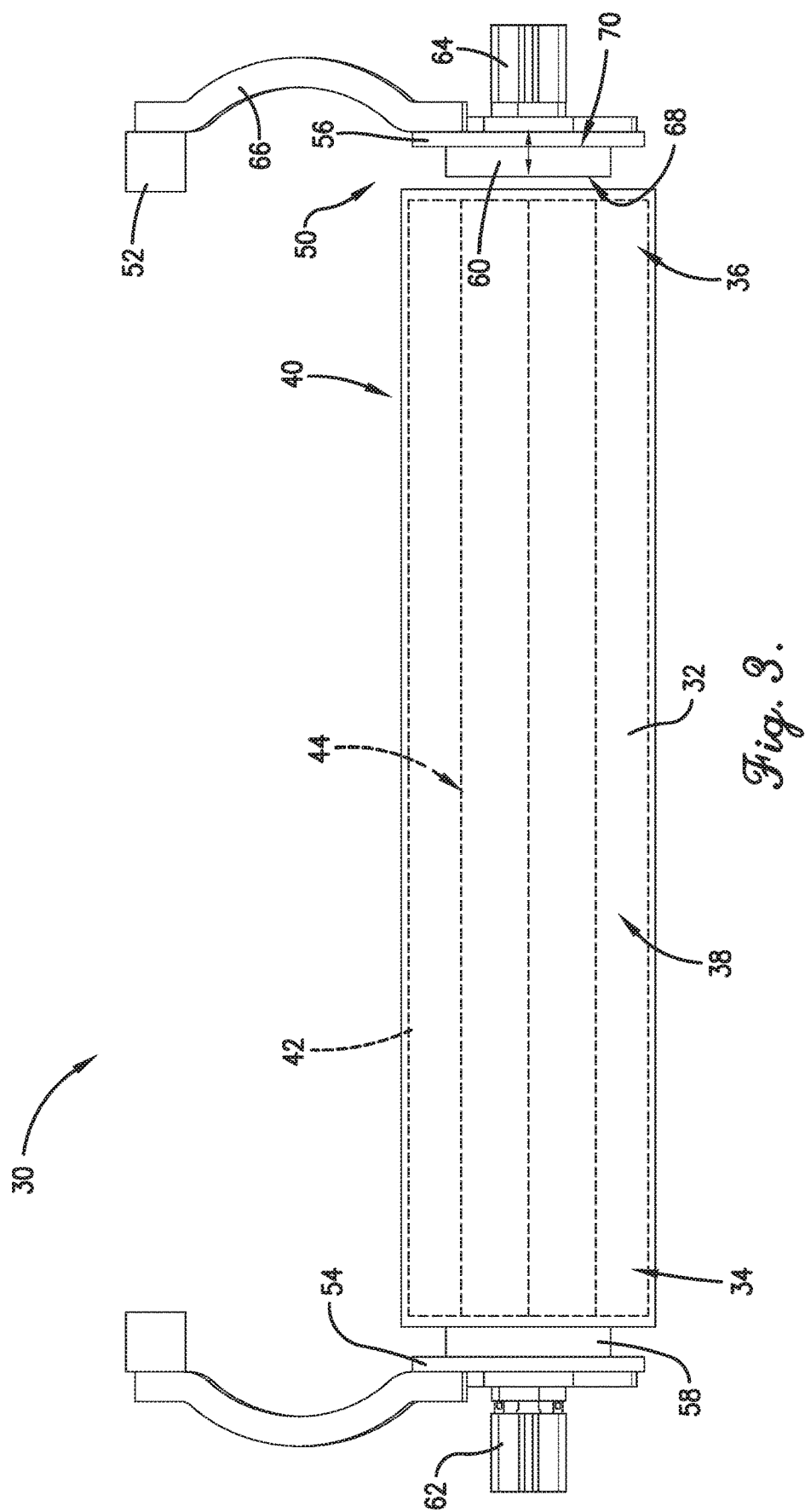
FIG. 3 is a plan view of an embodiment of a system for joule heating and forming a material blank and employing an active thermal buffer element positioned between the material blank and an electrical terminal.
Figure 12:
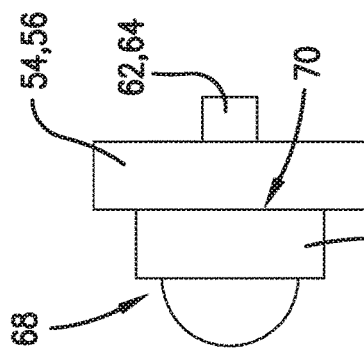
Figure 13:
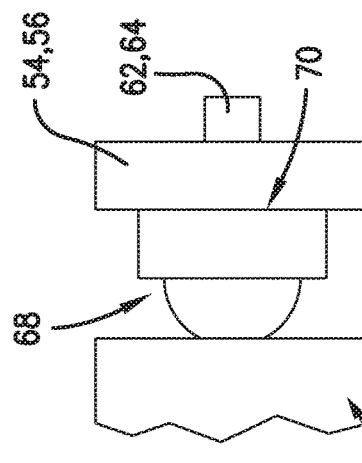

FIG. 12 is a cross-sectional elevation view of a portion of the system of FIG. 3, showing a third knurled implementation of a first face of the active thermal buffer element; and FIG. 13 is a cross-sectional elevation view of the portion of the system of FIG. 12, showing the third knurled implementation of the first face of the active thermal buffer element in operational contact with an end portion of the material blank.

Figure 14:
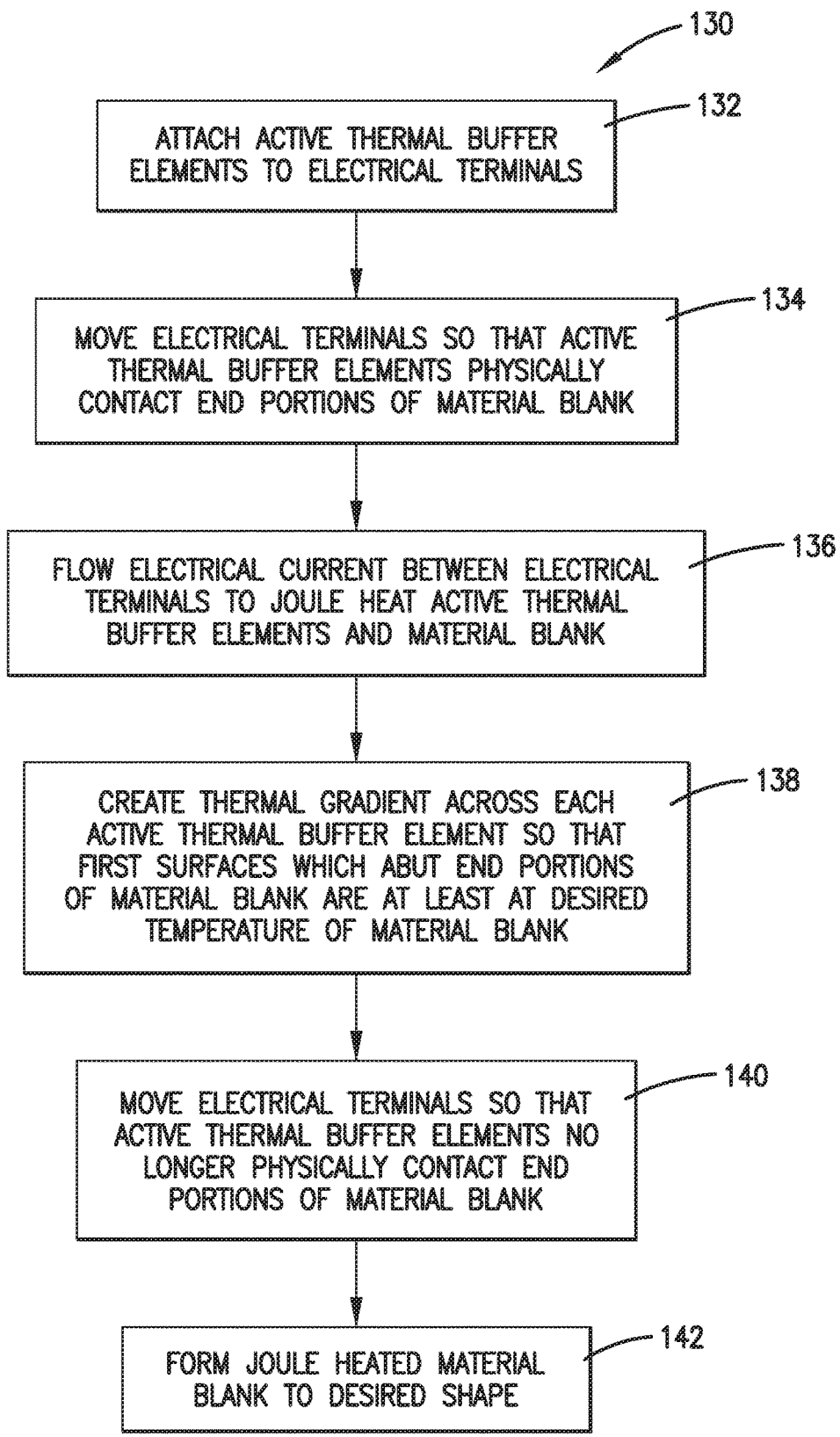

FIG. 14 is a flowchart of steps in an embodiment of a method of for joule heating and forming a material blank and employing an active thermal buffer element positioned between the material blank and an electrical terminal.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly, the present invention provides a system and method for improved joule heating of materials. More particularly, embodiments provide a system and method employing an active thermal buffer element to reduce the thermal effects of an electrical terminal on an end portion of a material, and thereby provide more consistent joule heating of the material. In one embodiment, the active thermal buffer element may be operationally (i.e., electrically and thermally) interposed between a metal or other material and the electrical terminals which deliver electrical current for joule heating the material blank.

The active thermal buffer element is an active thermal buffer in that it is also joule heated by the electrical current deliver by the electrical terminal to a temperature which is at least as high as the desired temperature of the end portion of the material blank. The active thermal buffer element advantageously increases efficiency and otherwise improves the joule heating and subsequent forming process by creating a thermal gradient across the active thermal buffer element such that a first surface of the active thermal buffer element which abuts the material blank is at least at the desired temperature and a second contact surface of the active thermal buffer element which abuts the electrical terminal may be at a relatively lower temperature due to a thermal heat sink effect of the electrical terminal. Thus, the active thermal buffer element, rather than the material blank, experiences the thermal effect of the electrical terminal. Because the active thermal buffer element allows for more effectively and fully heating the material blank, the material blank can be more fully utilized. More specifically, in contrast to the prior art, the end portions of the material blank are neither under- nor over-heated and therefore need not be removed and discarded following the joule heating process.

Although described herein in the example context of manufacturing aircraft, the present technology may be adapted for use in substantially any suitable application (in, e.g., the automotive industry and/or ship-building industries) involving the joule heating of material.

Figure 4:
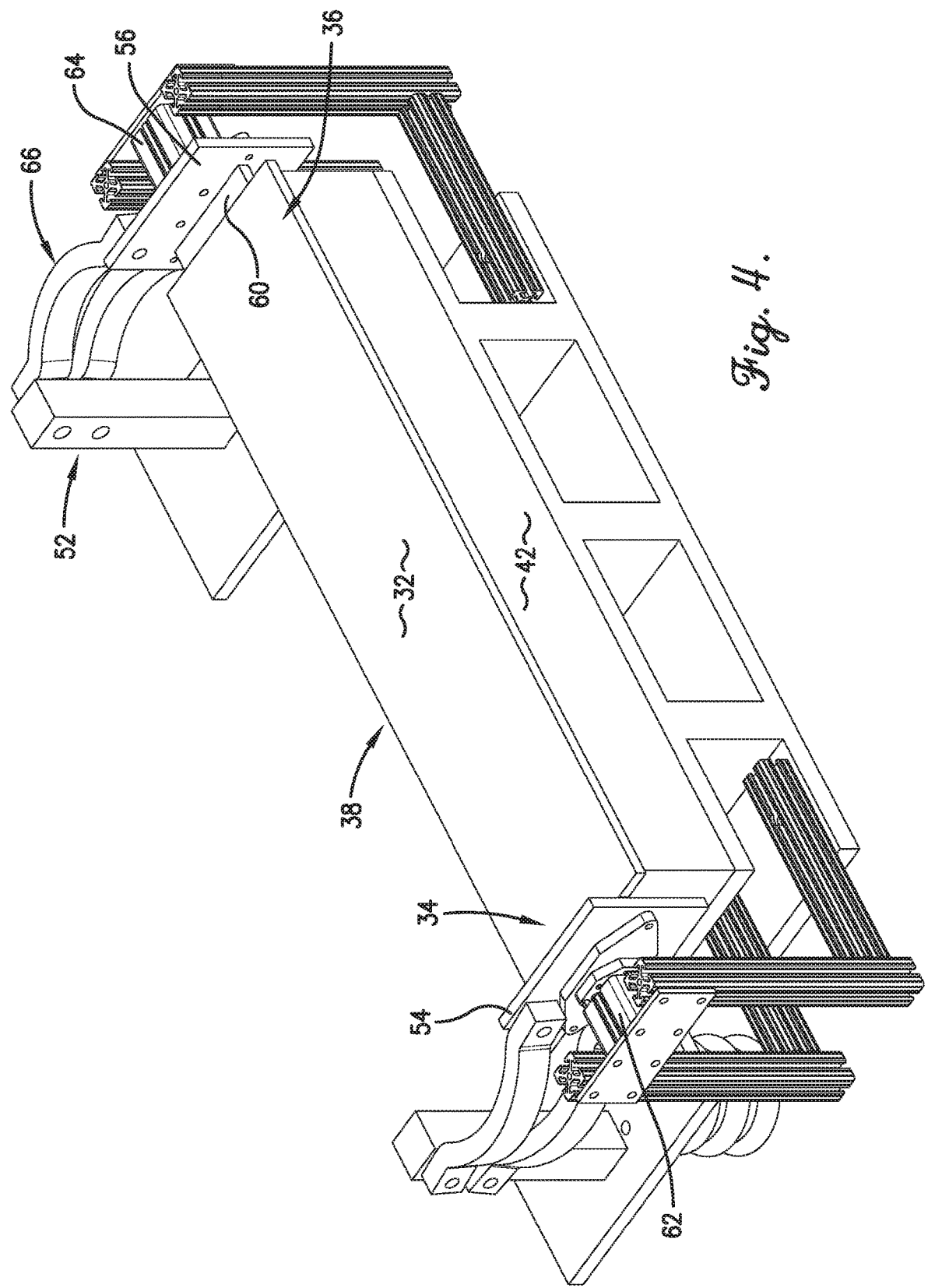
FIG. 4 is an isometric view of the system of FIG. 3, with the material blank in place.

Referring to FIGS. 3, 4, and 5, an embodiment of a system 30 is shown employing an active thermal buffer element to reduce the thermal effects of an electrical terminal on an end portion of a material blank 32, and thereby provide more consistent joule heating of the material. The material blank 32 may have first and second end portions 34,36 and an intermediate portion 38 extending therebetween. The material blank 32 may be constructed of substantially any material or combination of materials suitable for joule heating. The system 30 and an example operating environment for the system 30 may broadly include a forming subsystem 40 including a support element 42 and a forming tool 44, and a joule heating subsystem 50 including an electrical bus 52, first and second electrical terminals 54,56, first and second active thermal buffer elements 58,60, and first and second actuation elements 62,64.

The forming subsystem 40 may be configured to physically support and form the material blank 32 once the material blank 32 has been sufficiently joule heated. The support element 42 may be an otherwise substantially conventional support technology configured to securely physically support the material blank 32 in a desired position both for joule heating and subsequent forming. The forming tool 44 may be an otherwise substantially conventional forming technology configured to apply physical force to the material blank 32 in order to change a shape of the material blank 32.

The joule heating subsystem 50 may be configured to send electrical current through and thereby joule heat the material blank 32 to a desired temperature, wherein the desired temperature may be a desired temperature required for forming the material blank 32. The desired temperature may vary depending on such factors as the physical, electrical, and thermal properties of the material blank 32, and if applicable, the requirements of the forming process.

The electrical bus 52 may be configured to carry the electrical current from a current source for accomplishing the joule heating. The first and second electrical terminals 54,56 may be electrically connected to the electrical bus 52 and configured to deliver the electrical current to the material blank 32. The electrical terminals 54,56 may be constructed of copper or substantially any other suitable material or combinations of materials. The electrical terminals 54,56 may have a higher thermal conductivity than the material blank 32 to be joule heated, and may therefore behave as a heat or cold sink relative to the material blank 32. Each of the electrical terminals 54,56 may include a spring arm or other flexible member 66 connecting the electrical terminal 54,56 to the electrical bus 52 in such a manner as to accommodate movement of the electrical terminal 54,56 relative to the electrical bus 52 due to actuation of the actuation elements 62,64.

The first and second actuation elements 62,64 may be an otherwise substantially conventional actuation technology configured to move the electrical terminals 54,56 into and out of electrical contact with the material blank 32. In one implementation, each actuation element 62,64 may include an air or fluid actuatable component configured to selectively apply and remove a force to the electrical terminal 54,56 in order to move the electrical terminal 54,56 and the attached active thermal buffer element 58,60 into and out of contact with the end portions 34,36 of the material blank 32. The spring arms or other flexible members 66 of the electrical terminals 54,56 may accommodate the deflection resulting from the application and removal of this force.

Referring also to FIGS. 6 and 7, The active thermal buffer elements 58,60 may be electrically and thermally interposed between the electrical terminals 54,56 and the end portions 34,36 of the material blank 32, and may be constructed and/or configured to compensate for the thermal effects of the electrical terminals 54,56 and thereby maintain the temperature of the end portions 34,36 of the material blank 32. More specifically, each active thermal buffer element 58,60 may include a first contact surface 68 configured to physically abut the end portion 34,36 of the material blank 32, and a second contact surface 70 configured to abut the electrical terminal 54,56. In operation, the active thermal buffer element 58,60 may be joule heated along with the material blank 32, which may cause a temperature gradient to develop across the active thermal buffer element 58,60 such that the temperature at the first face 68 is at least the minimum temperature desired for the material blank 32, and the temperature at the second contact surface 70 may be relatively lower than the temperature material blank 32 due to the thermal heat sink effect of the electrical terminal 54,56.

The active thermal buffer element 58,60 may be constructed of any suitable material or combination of materials, and have substantially any suitable shape. Ideally, the active thermal buffer element may be constructed of a material which is both a perfect electrical conductor and a perfect thermal insulator. In practice, however, the active thermal buffer element 58,60 may be constructed of a material which has a sufficiently high electrical resistance so as to be joule heated to a temperature which compensates for the thermal heat sink effect of the electrical terminal 54,56 and maintains the adjacent end portion 34,36 of the material blank 32 at the desired temperature. In one implementation, in which the material blank 32 may be titanium, the active thermal buffer element 54,56 may be stainless steel or tungsten. In another implementation, the active thermal buffer element 54,56 may be constructed of two or more materials having different electrical and/or thermal characteristics. For example, layers of one material (e.g., an electrical conductor) may be alternated with layers of another material (e.g., an electrical and/or thermal insulator), or one material may be doped with another material.

Generally, the shape of the active thermal buffer element 58,60 and/or the shape of first and/or second contact surfaces 68,70 may be configured to achieve the desired electrical and/or thermal properties for a particular application. In one implementation, the active thermal buffer element 54,56 may have a generally rectangular shape.

Figure 8:
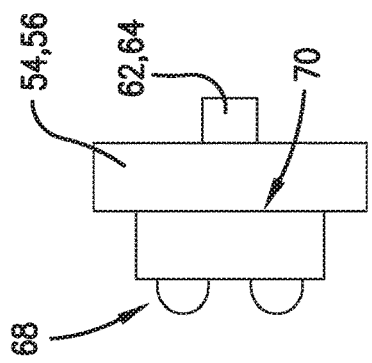
FIG. 8 is a cross-sectional elevation view of a portion of the system of FIG. 3, showing a first rounded implementation of a first face of the active thermal buffer element.
Figure 10:
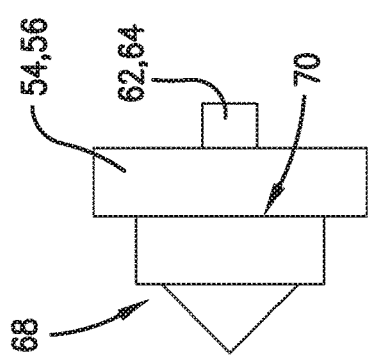
FIG. 10 is a cross-sectional elevation view of a portion of the system of FIG. 3, showing a second angled implementation of a first face of the active thermal buffer element.
Figure 9:
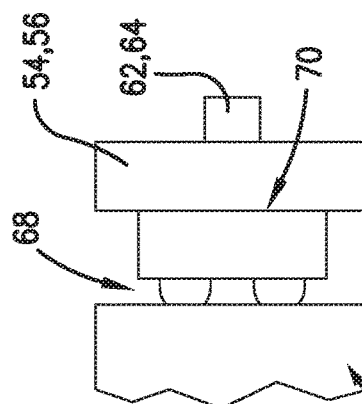
FIG. 9 is a cross-sectional elevation view of the portion of the system of FIG. 8, showing the first rounded implementation of the first face of the active thermal buffer element in operational contact with an end portion of the material blank.
Figure 11:
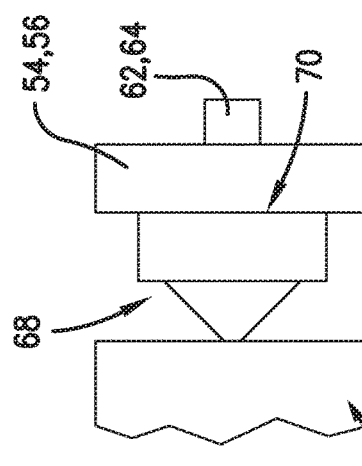
FIG. 11 is a cross-sectional elevation view of the portion of the system of FIG. 10, showing the second angled implementation of the first face of the active thermal buffer element in operational contact with an end portion of the material blank.

The end portion 34,36 of the material blank 32 may be imperfectly planar such that if the first contact surface 68 of the active thermal buffer element 58,60 were also planar, significant gaps may occur between the two contact surfaces, which may result in electrical arcing. Thus, referring also to FIGS. 4-9, in various implementations the first contact surface 68 may be rounded (FIGS. 8 and 9), angled (FIGS. 10 and 11), knurled (FIGS. 12 and 13), or otherwise shaped to better achieve electrical contact. Further, the actuation elements 62,64 may be configured to exert sufficient force to cause the first contact surface 70 to at least partially conform to (i.e., flatten against) the end portion 34,36 of the material blank 32 (as seen in FIGS. 8, 10, and 12).

The second contact surface 70 may be provided with one or more structures (e.g., threaded holes) for attaching (e.g., bolting) the active thermal buffer element 58,60 to the electrical terminal 54,56.

Referring also to FIG. 14, the system 30 may operate substantially as follows. The active thermal buffer elements 58,60 may be electrically and thermally interposed between the electrical terminals 54,56 and the end portions 34,36 of the material blank 32, as shown in 132 and 134. An electrical current may be delivered via the electrical terminals 54,56 to joule heat the active thermal buffer elements 58,60 and the material blank 32, as shown in 136, wherein the electrical terminals 54,56 have a thermal heat sink effect. Each active thermal buffer element 58,60 may be joule heated to create a temperature gradient across the active thermal buffer element 58,60 such that the first contact surface 68 is at least at the desired temperature and the second contact surface 70 is at a lower temperature due to the thermal heat sink effect of the electrical terminal 54,56, and thereby compensating for the thermal heat sink effect of the electrical terminal 54,56 and allowing the end portion 34,36 of the material blank 32 to reach the desired temperature, as shown in 138.

Additionally, before joule heating the material blank 32 and the active thermal buffer elements 58,60, the actuation elements 62,64 may move the electrical terminals 54,56 so that the active thermal buffer elements 58,60 are in physical contact with the end portions 34,36 of the material blank 32, as shown in 134. After joule heating the material blank 32 and the active thermal buffer elements 58,60, and before forming the material blank 32, the actuation elements 62,64 may move the electrical terminals 54,56 so that the active thermal buffer elements 58,60 are not in physical contact with the end portions 34,36 of the material blank 32, as shown in 140. The material blank 32 may then be formed to the desired shape as shown in 142.

The system 30 may include more, fewer, or alternative components and/or perform more, fewer, or alternative actions, including those discussed elsewhere herein, and particularly those discussed in the following section describing the method.

Referring again to FIG. 14, a flowchart of an embodiment of a method 130 is shown for employing an active thermal buffer element to reduce the thermal effects of an electrical terminal on an end portion of a material blank 32, and thereby provide more consistent joule heating of the material. Active thermal buffer elements may be attached or otherwise associated with respective electrical terminals 54,56 so as to be operationally (i.e., electrically and thermally) interposed between a metal or other material blank 32 and the electrical terminals 54,56 which deliver electrical current for joule heating the material blank, as shown in 132.

In one implementation, actuation elements 62,64 may move the electrical terminals 54,56 so that the first and second active thermal buffer elements 58,60 are in physical contact with the first and second end portions 34,36 of the material blank 32, as shown in 134.

Electrical current may then be made to flow through an electrical bus 52, through one electrical terminal 54 and its associated active thermal buffer elements 58, through the material blank 32, and through the other active thermal buffer 60 and its associated electrical terminal 56, thereby joule heating the active thermal buffer elements 58,60 and the material blank 32, as shown in 136.

The active thermal buffer elements may be joule heated until a thermal gradient is created across each active thermal buffer element, such that first surfaces of the active thermal buffer elements which abut end portions of the material blank are at least at the desired temperature of the material blank, wherein second contact surfaces of the active thermal buffer elements which abut the electrical terminals may be at a relatively lower temperature due to a thermal heat sink effect of the electrical terminals, as shown in 138. In this manner, then entire material blank, including the end portions, reaches the desired temperature, and the thermal effects of the electrical terminals are experienced by the active thermal buffer elements.

In one implementation, the actuation elements 62,64 may move the electrical terminals 54,56 so that the active thermal buffer elements 58,60 are no longer in physical contact with the end portions 34,36 of the material blank 32, and so that electrical current no longer flows through the material blank 32, as shown in 140. In one implementation, the joule heated material blank 32 may then be formed to a desired shape by, e.g., a forming tool, as shown in 142.

The method 130 may include more, fewer, or alternative actions, including those discussed elsewhere herein.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A system for achieving more consistent joule heating of a material blank to a desired temperature, the material blank having an end portion, the system comprising:
    an electrical terminal configured to deliver an electrical current from a same electrical current source via a same electrical circuit to the end portion of the material blank in order to joule heat the material blank, wherein the electrical terminal has a thermal heat sink effect; and
    an active thermal buffer element electrically and thermally interposed in electrical series between the electrical terminal and the end portion of the material blank, and configured to be joule heated by the electrical current from the same electrical current source via the same electrical circuit to actively create and maintain an increasing temperature gradient across the active thermal buffer element to the end portion of the material blank to compensate for the thermal heat sink effect of the electrical terminal and thereby allow the end portion of the material blank to reach the desired temperature.

2. The system of claim 1, the active thermal buffer element including
    a first contact surface configured to physically abut the end portion of the material blank; and
    a second contact surface configured to abut the electrical terminal,
    wherein joule heating of the active thermal buffer element actively creates the increasing temperature gradient across the active thermal buffer element such that the first contact surface is at least at the desired temperature and the second contact surface is at a lower temperature due to the thermal heat sink effect of the electrical terminal.

3. The system of claim 2, the material blank being constructed of titanium and the active thermal buffer element being constructed of stainless steel.

4. The system of claim 2, the material blank being constructed of titanium and the active thermal buffer element being constructed of tungsten.

5. The system of claim 2, the active thermal buffer element being constructed of two or more materials having different electrical or thermal characteristics.

6. The system of claim 2, the first contact surface having a non-planar shape selected from the group consisting of: rounded, angled, and knurled.

7. The system of claim 1, further including a forming subsystem configured to physically support and form the material blank into a desired shape once the material blank has been joule heated to the desired temperature, the forming subsystem including—
a support element configured to physically support the material blank in a desired position both for joule heating and for forming; and
a forming tool configured to apply a physical force to the material blank during forming to change an initial shape of the material blank to the desired shape.

8. The system of claim 7, further including a joule heating subsystem configured to send the electrical current through and thereby joule heat the material blank to a desired temperature in preparation for forming the material blank, the joule heating subsystem including—
an electrical bus configured to carry the electrical current from the same electrical current source to the electrical terminal for accomplishing the joule heating;
an actuation element configured to move the electrical terminal and the active thermal buffer element into and out of electrical contact with the material blank; and
a flexible member connecting the electrical terminal to the electrical bus, and configured to accommodate movement of the electrical terminal relative to the electrical bus during actuation of the actuation element.

9. A system for achieving more consistent joule heating of a material blank to a desired temperature in order to form the material blank into a desired shape, the material blank having an end portion, the system comprising:
a joule heating subsystem configured to send an electrical current from a same electrical current source via a same electrical circuit through and thereby joule heat the material blank to a desired temperature in preparation for forming the material blank, the joule heating subsystem including—
an electrical bus configured to carry the electrical current from a current source to the electrical terminal for accomplishing the joule heating,
an electrical terminal configured to deliver the electrical current to the end portion of the material blank in order to joule heat the material blank, wherein the electrical terminal has a thermal heat sink effect,
an active thermal buffer element electrically and thermally interposed in electrical series between the electrical terminal and the end portion of the material blank, and configured to be joule heated by the electrical current from the same electrical current source via the same electrical circuit to actively create and maintain an increasing temperature gradient across the active thermal buffer element to the end portion of the material blank to compensate for the thermal heat sink effect of the electrical terminal and thereby allow the end portion of the material blank to reach the desired temperature,
wherein the electrical current is simultaneously provided to the end portion of the material blank and to the active thermal buffer element,
an actuation element configured to move the electrical terminal and the active thermal buffer element into and out of electrical contact with the material blank, and
a flexible member connecting the electrical terminal to the electrical bus, and configured to accommodate movement of the electrical terminal relative to the electrical bus during actuation of the actuation element; and
a forming subsystem configured to physically support and form the material blank once the material blank has been joule heated to the desired temperature, the forming subsystem including—
a support element configured to physically support the material blank in a desired position both for joule heating and for forming; and
a forming tool configured to apply a physical force to the material blank during forming to change an initial shape of the material blank to the desired shape.

10. The system of claim 9, the active thermal buffer element including—
a first contact surface configured to physically abut the end portion of the material blank; and
a second contact surface configured to abut the electrical terminal,
wherein joule heating of the active thermal buffer element actively creates the increasing temperature gradient across the active thermal buffer element such that the first contact surface is at least at the desired temperature and the second contact surface is at a lower temperature due to the thermal heat sink effect of the electrical terminal.

11. The system of claim 10, the material blank being constructed of titanium and the active thermal buffer element being constructed of stainless steel.

12. The system of claim 10, the material blank being constructed of titanium and the active thermal buffer element being constructed of tungsten.

13. The system of claim 10, the active thermal buffer element being constructed of two or more materials having different electrical or thermal characteristics.

14. The system of claim 10, the first contact surface having a non-planar shape selected from the group consisting of: rounded, angled, and knurled.

15. The system of claim 14, the actuation element being configured to exert a force to cause the non-planar shape of the first contact surface to conform to the end portion of the material blank.

16. a method for achieving more consistent joule heating of a material blank to a desired temperature, the material blank having an end portion, the method comprising: electrically and thermally interposing in electrical series an active thermal buffer element between the electrical terminal and the end portion of the material blank, the active thermal buffer element including a first contact surface configured to physically abut the end portion of the material blank, and a second contact surface configured to abut the electrical terminal; delivering an electrical current from a same electrical current source via a same electrical circuit via and an electrical terminal to joule heat the active thermal buffer element and the material blank, wherein the electrical terminal has a thermal heat sink effect; and joule heating the active thermal buffer element to actively create an increasing temperature gradient across the active thermal buffer element such that the first contact surface is at least at the desired temperature and the second contact surface is at a lower temperature due to the thermal heat sink effect of the electrical terminal, and thereby compensating for the thermal heat sink effect of the electrical terminal and allowing the end portion of the material blank to reach the desired temperature.

17. The method of claim 16, the active thermal buffer element being constructed of two or more materials having different electrical or thermal characteristics.

18. The system of claim 16, the first contact surface having a non-planar shape selected from the group consisting of: rounded, angled, and knurled.

19. The method of claim 16, further including once the material blank is heated to the desired temperature, forming the material blank into a desired shape by applying a physical force with a forming tool to the material blank to change an initial shape of the material blank to the desired shape.

20. The method of claim 19, further including—
- before joule heating the material blank and the active thermal buffer element, moving with an actuation element the electrical terminal so that the active thermal buffer element is in physical contact with the end portion of the material blank; and
- after joule heating the material blank and the active thermal buffer element, and before forming the material blank, moving with the actuation element the electrical terminal so that the active thermal buffer element is not in physical contact with the end portion of the material blank.

* * * * *